United States Patent [19]

Heinold et al.

[11] Patent Number: 4,903,819

[45] Date of Patent: Feb. 27, 1990

[54] APPARATUS FOR TRANSPORTING GARMENT HANGERS

[75] Inventors: Hans Heinold, Dietzenbach; Josef Rau, Heppenheim; Thomas Unverzagt, Nauheim, all of Fed. Rep. of Germany

[73] Assignee: Sussman, Jennewein Bekleidungstechnik GmbH, Mörfelden-Walldorf, Fed. Rep. of Germany

[21] Appl. No.: 317,735

[22] Filed: Mar. 2, 1989

[30] Foreign Application Priority Data

Mar. 5, 1988 [DE] Fed. Rep. of Germany ....... 3807280

[51] Int. Cl.$^4$ ............................................. B65G 47/34
[52] U.S. Cl. ................... 198/465.4; 198/680; 198/486.1
[58] Field of Search ............... 198/465.4, 680, 678, 198/486.1, 486.1, 487.1

[56] References Cited

U.S. PATENT DOCUMENTS

| | | | |
|---|---|---|---|
| 3,002,635 | 10/1961 | Holland, Jr. | 198/465.4 X |
| 3,194,383 | 7/1965 | Kuwertz | 198/680 X |
| 3,415,352 | 12/1968 | Gerisch | 198/465.4 |
| 3,454,148 | 7/1969 | Harrison | 198/465.4 |
| 3,580,378 | 5/1971 | Pedersen | 198/465.1 |
| 4,598,812 | 7/1986 | Grube et al. | 198/465.4 X |

FOREIGN PATENT DOCUMENTS

| | | | |
|---|---|---|---|
| 0005539 | 11/1979 | European Pat. Off. | 198/465.4 |
| 0625977 | 9/1978 | U.S.S.R. | 198/465.4 |
| 2043569 | 10/1980 | United Kingdom | 198/465.4 |

Primary Examiner—Robert J. Spar
Assistant Examiner—D. Glenn Dayoan
Attorney, Agent, or Firm—Peter K. Kontler

[57] ABSTRACT

Apparatus for transporting garment hangers has an overhead track for one or more trolleys having horizontal webs for the hooks of a series of garment hangers. An upwardly sloping first ramp is adjacent a portion of the path of movement of the web of an oncoming trolley, and a downwardly sloping second ramp follows the first ramp. The ramps are disposed at one side of the track and diverge laterally from the path of movement of the trolleys. A conveyor with a set of entraining pins is set in motion when a trolley approaches the upwardly sloping ramp to transfer successive hooks or groups of successive hooks from the web of the foremost loaded trolley onto the first ramp where the hooks advance toward and thereupon slide along the second ramp. A second conveyor can be set in motion when a trolley approaches the first ramp to positively advance the foremost loaded trolley along the first ramp. The two conveyors can be driven by a common prime mover.

9 Claims, 3 Drawing Sheets

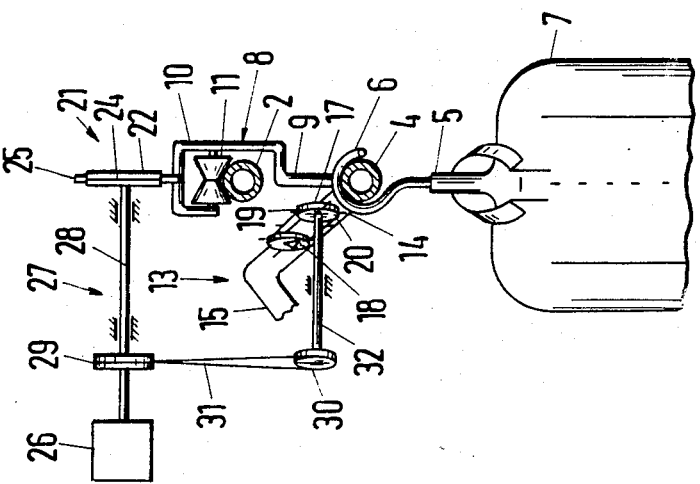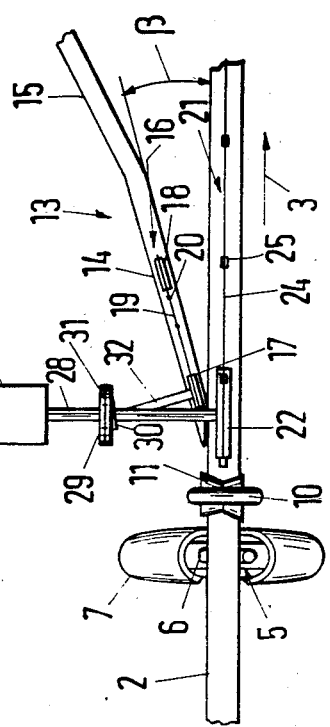

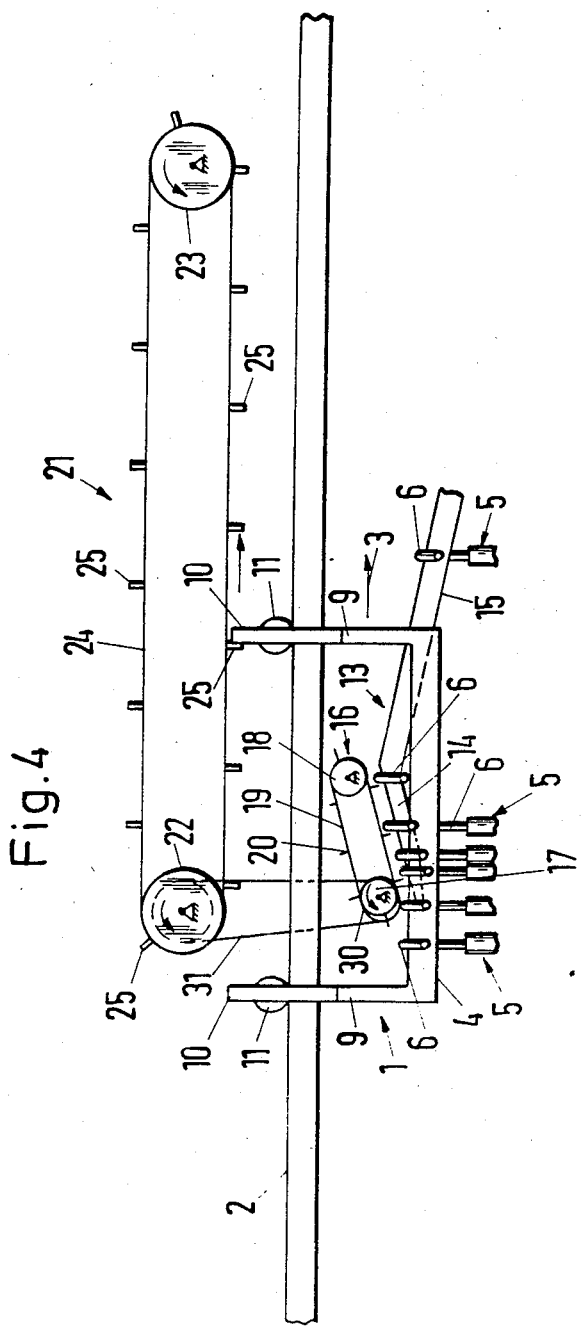

APPARATUS FOR TRANSPORTING GARMENT HANGERS

BACKGROUND OF THE INVENTION

The invention relates to apparatus for manipulating hangers for garments or the like, and more particularly to improvements in apparatus for transporting hangers of the type having hooks for suspension of hangers on rails, bars, ramps, rods or like supports. Still more particularly, the invention relates to improvements in apparatus which can be used with advantage to manipulate hangers which are delivered by conveyances, such as trolleys which are suspended from and can travel along overhead tracks, by chain conveyors or by other types of conveyors.

It is customary to suspend garments on hangers in a garment making plant, in a garment cleaning plant or in a shop which accepts garments for transport to a cleaning plant and where the garments are picked up by customers. As a rule, garment hangers are transported on chain conveyors, on rotary screw conveyors, by having their hooks slide along downwardly sloping ramps or on so-called trolleys having inverted U-shaped frames with upwardly extending legs which carry roller followers movable along an overhead track. The horizontal web between the upwardly extending legs of the trolley constitutes a support for the hooks of a series of neighboring garment hangers. When a trolley arrives at the unloading station, the hangers are removed by hand and are normally deposited on a downwardly sloping ramp so that the hooks of the manually transferred hangers can slide by gravity on their way to a further processing station or to storage. Manual transfer of hangers, especially of hangers which carry garments, is a time-consuming and tiresome task which is likely to constitute a bottleneck in the otherwise fully or partially automated production line.

OBJECTS OF THE INVENTION

An object of the invention is to provide a novel and improved apparatus for transporting garment hangers, especially for transferring hangers from a hanger delivering unit to a hanger receiving unit.

Another object of the invention is to provide an apparatus which is especially suited for transfer of garment hangers from a conveyance, such as a trolley, onto a ramp whereon the hangers can slide by gravity.

A further object of the invention is to provide the apparatus with a novel and improved hanger transferring unit.

An additional object of the invention is to provide an apparatus which can automatically transport, transfer and/or otherwise manipulate garment hangers at the rate they are supplied in a garment making, cleaning or other plant.

A further object of the invention is to provide an apparatus which can employ available hanger delivering units.

Still another object of the invention is to provide an apparatus which can transfer, transport and/or otherwise manipulate hangers at the rate they are delivered in an automated plant.

A further object of the invention is to provide a novel and improved method of automatically removing garment hangers from a trolley.

An additional object of the invention is to provide a novel and improved system of ramps for use in the above outlined apparatus.

SUMMARY OF THE INVENTION

The invention is embodied in an apparatus for transporting garment hangers of the type having inverted U-shaped or similar hooks for suspension on rods, bars, ramps, cables or like supports. The apparatus comprises means for delivering a series of hangers in a predetermined direction along a predetermined path and including a first support for the hooks of the hangers, and means for accepting hangers from the delivering means including a second support for the hooks of the hangers. The second support has a receiving section which is adjacent a predetermined portion of the path, and the apparatus further comprises means for transferring the hooks of successive hangers of the series from the first support onto the receiving section of the second support.

The delivering means can include a conveyance, and the receiving section of the second support can include an upwardly sloping first ramp. The second support preferably further includes a downwardly sloping second ramp which follows the upwardly sloping ramp and receives the hooks of successive hangers from the latter. The transferring means can comprise a conveyor having a plurality of entraining elements for the hooks of hangers reaching the predetermined portion of the path, and means for transporting the entraining elements along a second path having a portion adjacent the portion of the predetermined path so that an entraining element which moves along the portion of the second path engages an oncoming hook and conveys the thus engaged hook from the predetermined path onto and along the first ramp until the thus transferred hook reaches the second ramp where it can slide by gravity in a direction away from the first ramp.

The delivering means can include an overhead track for the conveyance, and such conveyance can include a trolley having at least one substantially vertical holder which extends from the first support to the overhead track. The receiving section of the second support is preferably disposed at one side of the predetermined path and diverges from the predetermined path in the predetermined direction. The track is or can be straight, at least in the region of predetermined portion of the predetermined path.

The means for entraining hooks of successive hangers along the upwardly sloping first ramp of the second support can include pins or otherwise configured pushers which are caused to advance along an endless path, e.g., by being attached to an endless chain or belt conveyor. As mentioned above, the first ramp slopes upwardly, and such ramp preferably defines a second path which diverges from the predetermined portion of the predetermined path in the predetermined direction.

The means for moving the conveyance along the predetermined path can include a prime mover, and the conveyor for the entraining means of the transferring means can derive motion from such prime mover.

The predetermined path is or can be substantially horizontal. The (second) path which is defined by the first ramp of the second support slopes upwardly and diverges from the predetermined path in the predetermined direction, and the (third) path which is defined by the second ramp can slope downwardly and can diverge from the second path in the predetermined direction. Thus, the hook of a garment which has been removed from the first support can be caused to alter the direction of its movement twice (upwardly and sideways) as a result of transfer from the first support onto the first ramp, and such hanger again changes the direction of its movement more than once (namely by moving downwardly and sideways) as a result of transfer onto the second ramp.

The operation of the apparatus can be automated by providing one or more sensors which start the prime mover when the hook of a hanger reaches the predetermined portion of the predetermined path. This sets in motion the entraining means of the transfer means so that the hangers are transferred from the predetermined path onto the first ramp at the rate they reach the predetermined portion of the predetermined path.

The novel features which are considered as characteristic of the invention are set forth in particular in the appended claims. The improved apparatus itself, however, both as to its construction and its mode of operation, together with additional features and advantages thereof, will be best understood upon perusal of he following detailed description of certain presently preferred specific embodiments with reference to the accompanying drawing.

BRIEF DESCRIPTION OF THE DRAWING

FIG. 2 is a plan view of a portion of the structure which is shown in FIG. 1;

FIG. 3 is a transverse vertical sectional view substantially as seen in the direction of arrows from the line III—III of FIG. 1; and FIG. 4 is a view similar to that of FIG. 1 but showing the transferring means in the process of transferring successive hangers from the conveyance onto the accepting unit.

DESCRIPTION OF PREFERRED EMBODIMENTS

Figure 1:
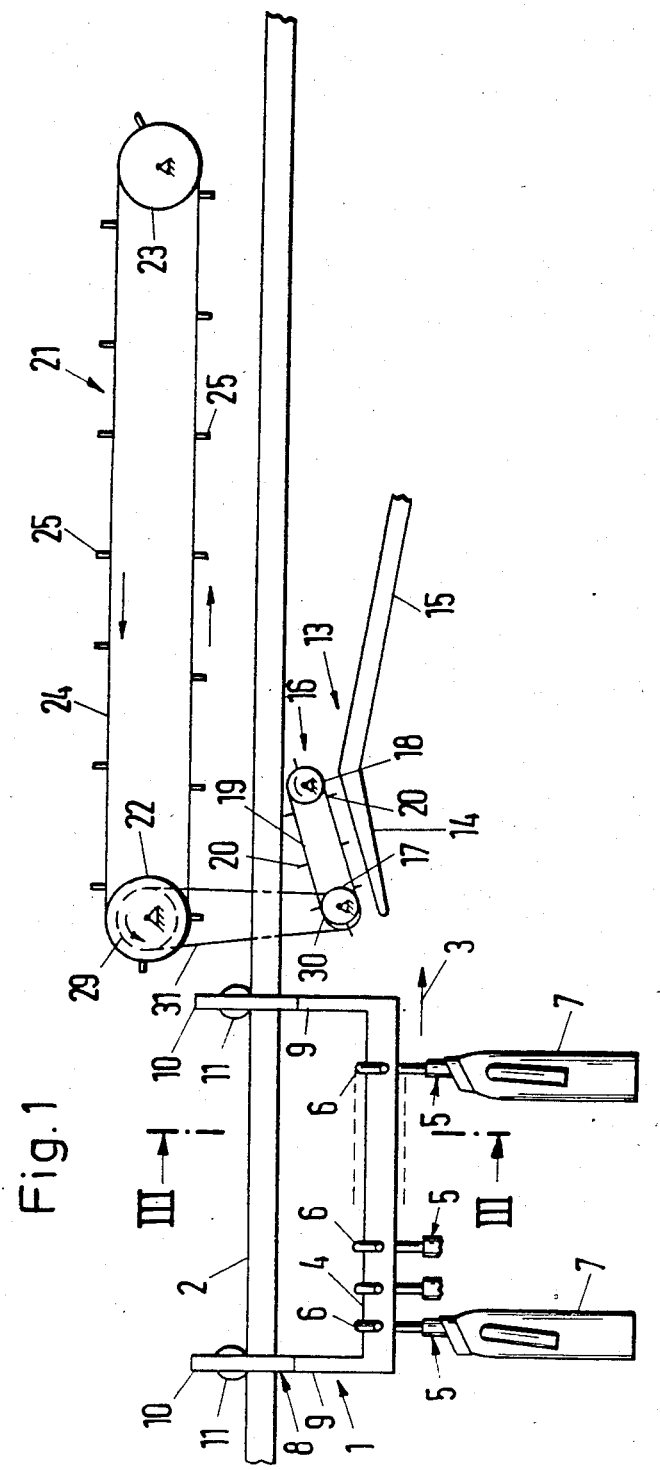
FIG. 1 is a fragmentary side elevational view of an apparatus which embodies one form of the invention, a conveyance in the form of a trolley being in the process of advancing toward the transfer station where the hangers are to be transferred from the conveyance onto the first ramp of a hanger accepting unit.

The apparatus which is shown in the drawing includes a delivering unit, an accepting unit 13, and a transferring unit 16. The delivering unit includes an inverted U-shaped conveyance 1 in the form of a trolley, and an overhead track 2 for the trolley. The track 2 defines a predetermined (e.g., endless) path for the transport of sets of garment hangers 5 toward the transferring unit 16. The (predetermined) direction along which the trolley 1 is caused to advance along the path which is defined by the track 2 is indicated by the arrow 3. The arrangement can be such that the track portion to the left of that shown in FIG. 1 slopes downwardly so that the trolley 1 can advance along such downwardly sloping track portion b gravity on its way toward the accepting unit 16. It is clear that, as a rule, the delivering unit will include at least two (but preferably a substantial number of) trolleys 1 which can advance along an endless path from the accepting unit 16 to a loading station (not shown) and back toward and on to the accepting unit.

The trolley 1 has an inverted U-shaped frame including a substantially horizontal web 4 which constitutes a (first) support for a series of garment hangers 5. Each garment hanger has an inverted U-shaped or similar hook 6 (see particularly FIG. 3) which overlies the web 4. The illustrated hangers 5 carry coats 7; however, it is clear hat they can serve to support any other types of garments including blouses, shirts, jackets, slacks, skirts or others. The frame of the trolley 1 further includes two substantially vertical portions or legs 9 having inverted U-shaped yokes 8 with upper portions 10 which carry roller followers 11 resting on the track 2. The latter can constitute a hollow pipe having a circular cross-sectional outline (FIG. 3).

The accepting unit 13 constitutes a second support for the hangers 5 and includes a receiving section 14 in the form of an upwardly sloping ramp, and a second section or ramp 15 which follows the section 14 and slopes downwardly to an extent which suffices to ensure that a hook 6 which has been advanced over the apex between the meeting ends of the two ramps will slide by gravity toward a further treating or processing station, not shown. FIG. 2 shows that the first ramp or section 14 defines a second path which diverges (as seen in the direction of arrow 3) laterally from the path which is defined by the track 2, and that the second section or ramp 15 defines a third path which also diverges laterally (again as seen in the direction of arrow 3) from the path which is defined by the track 2 as well as from the path which is defined by the section or ramp 14.

The section or ramp 14 is immediately or very closely adjacent that portion of the first path where the web 4 advances a series of hangers 5 toward the transfer station. The transition from the topmost portion of the ramp 14 onto the topmost portion of the ramp 15 can be rather pronounced (as shown in FIG. 1) or smooth.

The transferring unit 16 has an endless conveyor 19 (e.g., a chain conveyor) which is provided with a plurality of outwardly extending entraining elements 20 in the form of pushers which can engage the oncoming hooks 6 and travel along an endless path a portion of which extends along the upwardly sloping ramp 14. The lower reach of the conveyor 19 has a component of movement in the direction of arrow 3 and a component of movement in the direction of the path defined by the ramp 14. The length of the conveyor 19 suffices to ensure that a hook 6 which has been engaged by an entraining element 20 is reliably lifted off the support 4 (because the ramp 14 slopes upwardly) and advances along the ramp 14 all the way to the ramp 15 where the respective hanger 5 is free to slide by gravity along the aforementioned downwardly sloping third path. The entraining elements 20 extend substantially radially of the two sprocket wheels 17, 18 for the conveyor 19 during travel along the two end turns of this conveyor.

The means 21 for moving the trolley 1 along the track 2 at and beyond the transfer station includes a second endless conveyor 24 (e.g., a chain) which is trained over pulleys 22, 23 and is provided with outwardly extending entraining elements or pushers 25 which can engage the yokes 8 of the oncoming trolley 1 and push the trolley along the track 2 in the direction of arrow 3. The lower reach of the conveyor 24 is parallel to the adjacent straight portion of the track 2. The pushers 25 can constitute pins which extend radially of the sprocket wheels 22, 23 during travel along the respective end turns of the conveyor 24.

In accordance with a further feature of the invention, the apparatus comprises a single prime mover 26 (e.g., a variable-speed electric motor) which can drive the moving means 21 for the trolley 1 as well as the conveyor 19 of the transferring unit 16. The means for transmitting motion from the motor 26 to the conveyors 19 and 24 comprises a transmission 27 (FIGS. 2 and 3) having a shaft 28 which drives the sprocket wheel 22 for the conveyor 24, a second shaft 32 which drives the sprocket wheel 17 for the conveyor 19, a sprocket wheel or pulley 29 on the shaft 28, a sprocket wheel or pulley 30 on the shaft 32, and an endless belt or chain 31 which is trained over the pulleys or sprocket wheels 29, 30 and rotates the shaft 32 in response to rotation of the shaft 28. The shaft 28 is normal to the plane of the conveyor 24, and the shaft 32 is normal to the plane of the conveyor 19. The planes of the conveyors 19, 24 make an acute angle beta, the same as the paths which are defined by the track 2 and ramp 14.

When a trolley 1 reaches the moving means 21, the front yoke 8 is engaged by one of the pushers 25 to advance the trolley in the direction of arrow 3 (see FIG. 4). The prime mover 26 can be started in automatic response to a signal from a proximity detector (not shown) which monitors the path for the trolleys and generates a signal when it detects an oncoming yoke 8. At the same time, the transmission 27 drives the conveyor 19 so that the entraining elements 20 engage and transfer successive hooks 6 from the web or support 4 of the advancing trolley 1 onto the upwardly sloping ramp 14 of the support which constitutes the accepting unit 13. A hook 6 which is engaged by an entraining element 20 slides off the web 4 and onto the ramp 14 to then advance sideways (away from the vertical plane of the track 2) toward and onto the downwardly sloping ramp 15. Each entraining element 20 can push two or more successive hooks 6, depending upon the distribution of hooks 6 on the web 4 and on the mutual spacing of neighboring entraining elements 20 on the conveyor 19. An entraining element 20 can advance the engaged hook or hooks 6 all the way to the junction of the ramps 14, 15 or at least to an extent which suffices that the hook or hooks 6 on the ramp 14 are pushed toward the ramp 15 by the next-following hook or hooks.

The transferring unit 16 can be replaced with a transferring unit having a disc- or wheel-shaped conveyor with radially outwardly extending entraining elements to replace the conveyor 19 and elements 20. The plane of such wheel is normal to the plane of the conveyor 20 and is parallel to and disposed at a level above the path which is defined by the upwardly sloping ramp 14. This enables the radially extending entraining elements of the disc- or wheel-shaped conveyor to push the hooks 6 of successive hangers 5 (or the hooks of successive groups of two or more hangers each) off the web 4 of the advancing trolley 1 and onto the ramp 14 as well as to advance the transferred hooks at least partly toward the topmost portion of the ramp 15.

The illustrated trolley 1 can be replaced with a trolley having a single upwardly extending leg which replaces the legs 9 and their extensions 8 and can be engaged by a pusher 25 of the conveyor 24 when the trolley is to be advanced along and beyond the ramp 14.

An advantage of the mutual inclination of paths which are defined by the track 2 and ramp 14 is that the trolley 1 can readily advance past the support 13 and that successive hooks 6 can be readily transferred onto the ramp 14 without interfering with forward movement of the trolley and vice versa.

The apparatus can be provided with discrete prime movers for the conveyors 19 and 24. A common prime mover (26) is preferred at this time because this reduces the energy requirements of the apparatus and simplifies synchronization of movements of the entraining elements 20 and pushers 25. The illustrated transmission 27 can be replaced with any other suitable transmission without departing from the spirit of the invention.

Apparatus which can receive garment hangers from the ramp 15 are disclosed, for example, in U.S. Pat No. 4,276,995 granted July 7, 1981 to Jennewein for "Garmenthanging station on a conveyor", in copending patent application Ser. No. 268,177 filed Nov. 7, 1988 for "Apparatus for attaching labels to hooks of garment hangers", and in copending patent application Ser. No. 301,511 filed Jan. 24, 1989 for "Apparatus for singularizing garment hangers".

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for transporting garment hangers of the type having hooks, comprising means for delivering a series of hangers in a predetermined direction along a predetermined path, including a first support for the hooks of hangers; means for accepting hangers from said delivering means, including a second support for the hooks of hangers, said second support having a receiving section adjacent a predetermined portion of said path, said receiving section including an upwardly sloping first ramp and said second support further comprising a downwardly sloping second ramp following said upwardly sloping ramp; and means for transferring the hooks of hangers of said series from said first support onto said receiving section, said transferring means comprising a conveyor having a plurality of entraining elements for the hooks of hangers reaching said portion of said path, and means for transporting said entraining elements along a second path having a portion adjacent said portion of said predetermined path so that an entraining element moving along said portion of said second path engages an oncoming hook and conveys the hook from the predetermined path onto and along said first ramp toward said second ramp.

2. The apparatus of claim 1, wherein said delivering means includes at least one conveyance.

3. The apparatus of claim 1, wherein said delivering means includes at least one conveyance and an overhead track for the conveyance.

4. The apparatus of claim 3, wherein said at least one conveyance includes a substantially vertical portion extending from said first support toward said track, said receiving section being disposed at one side of said path and diverging from said path in said predetermined direction.

5. The apparatus of claim 3, wherein said track is substantially straight in the region of said portion of said path.

6. The apparatus of claim 1, wherein said delivering means includes a conveyance and means for moving said conveyance along said path.

7. The apparatus of claim 6, further comprising a common prime mover for said moving means and said conveyor.

8. The apparatus of claim 1, wherein said path is substantially horizontal and said receiving section defines a third path which diverges from the first path in said direction.

9. The apparatus of claim 8, wherein said second ramp defining a fourth path which follows said second path, and diverges from the third path in said direction.

* * * * *